United States Patent [19]

Munker et al.

[11] 4,192,208
[45] Mar. 11, 1980

[54] TRANSVERSE DIVIDING SHEAR FOR ROLLING-MILL PRODUCTS, ESPECIALLY HEAVY PLATE

[75] Inventors: Erich Münker, Kreuztal; Alfred Klein, Hildenbach; Gerhard Heitze, Netphen, all of Fed. Rep. of Germany

[73] Assignee: Schloemann-Siemag Aktiengesellschaft, Düsseldorf, Fed. Rep. of Germany

[21] Appl. No.: 914,903

[22] Filed: Jun. 12, 1978

[30] Foreign Application Priority Data

Jun. 23, 1977 [DE] Fed. Rep. of Germany ....... 2728202

[51] Int. Cl.² .............................................. B26D 7/02
[52] U.S. Cl. ...................................... 83/438; 83/282; 83/459; 83/461; 83/467 R; 83/636
[58] Field of Search ................. 83/438, 459, 461, 467, 83/636, 268, 282

[56] References Cited

U.S. PATENT DOCUMENTS

| 271,956 | 2/1883 | Wais | 83/636 X |
|---|---|---|---|
| 438,222 | 10/1890 | Bertsch | 83/636 X |
| 2,809,696 | 10/1957 | Miller | 83/438 |

*Primary Examiner*—Frank T. Yost
*Attorney, Agent, or Firm*—Karl F. Ross

[57] ABSTRACT

A transverse shear for severing successive sections of heavy metal plate from a length thereof comprises, in addition to the stationary lower blade, a holddown clamp upstream of the blade for pressing the length of plate thereagainst, a movable upper blade which tends to displace the plate to the side toward which the cut progresses, and lateral support elements along the longitudinal edge of the plate at this side, at least one pair of tongs which grip the downstream plate section to be severed along this edge and hold it in position against the tendency of the cut to form a wedge-shaped gap converging toward the aforementioned side. Preferably two such pairs of tongs are provided, both spaced from the cutting location and in spaced relationship to each other.

10 Claims, 4 Drawing Figures

TRANSVERSE DIVIDING SHEAR FOR ROLLING-MILL PRODUCTS, ESPECIALLY HEAVY PLATE

FIELD OF THE INVENTION

The present invention relates to a transverse shear for rolling-mill products, especially heavy plate (boiler plate) and like rolled sheet metal products. More particularly, the invention relates to a dividing shear for subdividing a length of rolled mill plate transversely at a fixed location.

BACKGROUND OF THE INVENTION

In a rolling mill for steel sheet of plate, it is common to provide at least one shear for subdividing a length of the rolled mill product, e.g. heavy sheet steel or steel plate, into lengths of a selected size after rolling has been completed.

A typical dividing shear for this purpose, e.g. the transverse subdivision of a boiler plate and like heavy milled product, generally includes a transport path (roller conveyor) for the length of the rolled mill product to be subdivided and a shear stand athwart the path for severing the length into sections.

The shear can include a spatially fixed lower blade and a movable upper blade formed as an inclined blade (vertically movable guillotime-type blade) or as a roll-shearing blade.

The inclined edge of the descending movable blade or the rolling movement of the roll-shearing blade, in cutting through the metal, generates a cutting-force component in a transverse direction (i.e. the direction in which cutting progresses across the plate) which is taken up by guide rollers or like lateral supporting elements along the longitudinal edge of the plate opposite to that at which the cutting commences.

In addition, hold-down means, e.g. a clamp immediately upstream of the blades, presses the plate against the fixed lower blade.

In the transverse subdivision of milled products by means of dividing shears of the aforedescribed type, the incoming section of sheet or plate is, on the one hand, guided along the aforementioned rollers or lateral supporting elements and, on the other hand, by the hold-down clamps, is secured in a precisely fixed position.

At the downstream side, however, the blade section which is to be cut off from the length is subjected to force components of the type described because of the passage of the upper blade through the sheet. This force component has a tendency to displace the plate in the region of cutting, transversely to its plane, i.e. in the vertical direction. This displacement is induced by the vertical passage of the blade through the plate and as a result, the downstream side of the plate is generally provided on a so-called rocker whose movement leads the cutting stroke of the upper blade.

In addition, because of the inclination of the cutting edge of the linearly displaceable upper blade or the rolling movement thereof, a cutting force component is applied to the downstream side of the plate, i.e. to the plate section to be severed, which tends to shift the latter in a direction parallel to the cutting line. This tendency is taken up the by aforementioned guide rollers or, more generally, by the lateral-supporting elements.

In addition, however, the cutting action results in a so-called springing or "chewing" pressure between the blade flanks of the upper and lower blades which tends to swing the downstream plate section substantially transversely to the cutting line with a substantially horizontally directed force. This is recognized as a tendency of the cut line to widen from the starting side toward the side at which cutting terminates.

As a result, the cut tends to separate at the starting side and with the progress of the cutting operation in the form of a wedge-gap which converges toward the supported longitudinal edge of the length of plate. The widest portion of this gap is at the longitudinal edge at which the cut commences.

This tendency to rotate the section of plate which is to be severed from the length cannot always be effectively taken up by the guide rollers or like lateral support elements. As a consequence, especially when conventional shears of the aforedescribed type are used and the mill product has a large thickness, as is the case with boiler plate and like thicknesses of steel, the cut may be imprecise and is seldom clean. In other words, the tendency to twist the severed section of the plate in a horizontal plane away from the remainder of the length thereof has a tendency to tear the plate and reduce the cleaness of the cut.

OBJECT OF THE INVENTION

It is the principal object of the present invention to overcome this disadvantage of conventional shears.

SUMMARY OF THE INVENTION

The present invention solves the aforedescribed problem by resisting the horizontal force component which tends to swing the cut portions of the plate from the remainder thereof and thus prevents the formation of the wedge-shaped gap and thereby insures a clean cut with a conventional guillotine-type inclined vertically movable blade or roll-shearing blade.

This is accomplished according to the invention by providing at least one pair of tongs capable of clampingly engaging the longitudinal edge of the downstream section of the plate at a location spaced downstream from the cutting location and which can engage the plate and hold the latter in a fixed location relative to the lateral-guide elements.

In other words, the present invention provides a pair of clamping tongs which extend parallel to the cutting edge but are provided downstream of the lateral-supporting elements and grip the longitudinal edge of the section of plate which is to be cut from the length thereof at a location spaced downstream from the cutting edge and the lateral-support elements so as to retain this plate against horizontal displacement and thus swinging movement. The swinging movement which tends to widen the gap and thus bring about the wedge-shaped configuration thereof is thus precluded.

It has been found to be advantageous and is the best mode of carrying out the present invention in practice, for a plurality of pairs of clamping tongs which can be of identical construction, to be provided in mutually spaced relationship for gripping the downstream section of the plate. The two or more pairs of clamping tongs are spaced one downstream from the other and are provided in such number and at such locations as to ensure that they will be capable of taking up the horizontal forces described previously at a plurality of locations reliably and thereby ensure effective retention of the section of plate as it is cut off from the length against movement.

Advantageously, and according to another feature of the invention, the clamping jaws of the tongs grip the plate from opposite sides and are pressed forcibly thereagainst along the longitudinal edge of the plate section which is engaged by the guide rollers or like lateral-supporting elements or in the region of this edge.

Each of the pairs of clamping tongs can comprise two double-arm levers both of which are swingable about respective axes or fulcra parallel to the plane of the plate and to the aforementioned longitudinal edge and preferably disposed above and below the upper and lower surface planes of the plate respectively.

The pairs of axes of each pair of tongs can be disposed at predetermined distances between them, i.e. one over the other, while the clamping jaws at the ends of the lever arms overhanging and underlying the plate can be pivotally mounted on these ends of the arms. The pivot axes of the jaws on the lever arms can also be parallel to the plane of the plate and parallel to the respective fulcra.

The ends of the levers arms remote from the jaws are provided with a clamping drive, preferably a fluid-pressure piston-and-cylinder arrangement, usually a hydraulic cylinder, for spreading these ends of the tongs arms or levers apart and thereby clamping the jaws forceably against the upper and lower surfaces of the plate.

This arrangement and construction of the clamping tongs (i.e. the pivots and axes thereof) has the significant advantage that the pair of tongs is free to move in a parallelogrammatic fashion transverse to the plane of the plate and can enable the downstream section of the plate to be freely swingable in the vertical direction with the usual rocker. However, a relative movement of the clamp jaws and the plate which is severed from the length is excluded.

So that the clamping tongs, in their open state, always assume a position enabling the plate section to pass in between the two jaws, it has been found to be advantageous to provide balancing or counterbalancing weights which are connected to the lever arms of the double-arm levers provided with the clamping drive which tends to swing the arms into the open positions.

Secure support of the clamping tongs against movement in the direction of the supported longitudinal edge of the plate can be assured in a single manner if the lever arms in the region of their free ends provided with the clamping jaws are supported in a guide permitting vertical movement.

It has been found to be important, in conjunction with the aforedescribed elements of the invention to provide adjustable abutment means for limiting the total vertical swing of the levers by adjustable abutments.

BRIEF DESCRIPTION OF THE DRAWING

The above and other objects, features and advantages of the present invention will become more readily apparent from the following description, reference being made to the accompanying drawing in which.

SPECIFIC DESCRIPTION

In the following description, reference will be had to a guillotine-type shear for severing heavy steel plate, especially steel plate and like rolling mill products of a thickness corresponding to boiler plate and greater thicknesses, although the invention is equally applicable to roll-shear blades and the like. The details of such shears, insofar as the conventional parts thereof are concerned, can be found in *The Making, Shaping and Treating of Steel,* United States Steel Company, Philadelphia, Pa., 1971, pp 736ff. To the extent that such elements are known and are not relevant to the present improvement, they have not been described.

Figure 1:
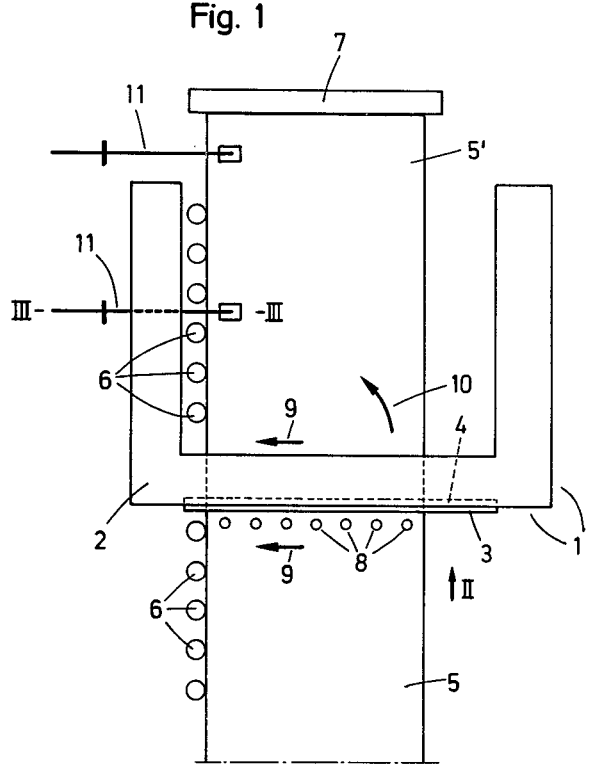
FIG. 1 is a simplified schematic plan view of a transverse shear for steel plate according to the present invention.
Figure 2:
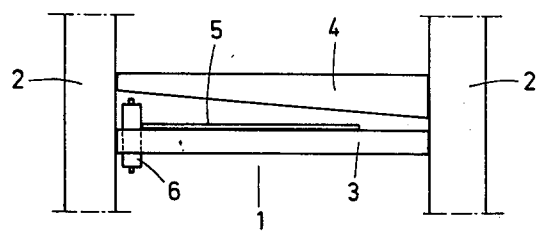
FIG. 2 is another schematic illustration of a portion of a shear seen in the direction of the arrow II of FIG. 1.

FIGS. 1 and 2 show a transverse shear 1 for severing a length of rolling-mill plate 5 into sections 5' of a selected length. The transverse shear 1 comprises a stand 2 which is formed with a stationary lower blade 3 which, as can be seen from FIG. 2, is horizontal and has a horizontal cutting edge.

Relative to this lower blade 3, an upper blade 4 is guided for vertical movement by means not shown and can be constituted either as a rolling-shear blade or, as has been illustrated in FIG. 2, as a guillotine-type blade with an inclined cutting edge.

Through the opening in the stand 2, the rolled plate 5 can be passed on a conventional conveyor system such as a roller conveyor, the downstream side of which can be provided with the usual rocker.

The left-hand longitudinal edge of the plate 5 is supported or guided by the guide rollers 6 which are rotatable about and constitute lateral-support elements. The leading edge of the plate engages an adjustable stop 7, shown schematically as a bar.

In addition, at the upstream side of the shear 1, there are provided hold-down clamps represented at 8 for retaining the plate 5 downwardly against the lower blade 3 immediately adjacent the latter. The hold-down clamps 8 are brought into play as soon as the cutting stroke of the blade 4 commences.

The cutting stroke begins along the right-hand edge of the plate and the right-hand end of the movable blade 4 and advances toward the left as represented by the arrows 9.

As a result, a cutting force component is generated in the direction of arrows 9 (FIG. 1), i.e. in a direction urging the plate against the lateral-support elements 6.

Simultaneously, the aforedescribed chewing pressure or spreading pressure develops which tends to swing the downstream section 5' of the plate in the direction of arrow 10 and widen the cutting gap so that the latter, in the absence of appropriate support, will develop a wedge shape converging toward the left. When such a wedge-shaped cut tends to develop, there is a tearing phenomenon ahead of the blade which distorts the cut edge and prevents the blades 4 and 3 from severing the section 5' with the desired tolerances of the plate dimensions.

To eliminate this effect, the shear 1 is provided at its downstream side with a pair of clamping tongs 11 disposed between the guide elements 6 and a further pair of clamping tongs 11 spaced downstream of the first pair and disposed between the stop 7 and the last of the guide elements 6 along the path of the plate.

These clamping tongs 11 grip the section 5' of the plate to be severed and clamp the latter in its starting position relative to the guide elements 6 so that a shifting of this plate section in the direction of arrow 10 is precluded. The construction and operation of each of the pairs of clamping tongs 11 will be further elucidated in connection with FIGS. 3 and 4.

Each of the pairs of clamping tongs 11 comprises two double-arm levers 12 and 13, each of which is swingable about a respective horizontal axis 14, 15 in a frame 16. The horizontal axes or pivots 14 and 15 thus constitute respective fulcra for the double-arm levers 12 and 13. The free ends of the levers 12 and 13 can thus be swung in opposite directions in a clamping engaging of the plate section 5'.

The longer lever arms 12' and 13' of the double-arm levers 12 and 13 carry, in the regions of their free ends, slide plates 17 which ride along cheek plates 18 in the vertical direction, the cheek plates 18 being fixed along the inner flanks of the frame 16.

The mutually slideably engageable faces of the plates 17 and 18 may be coated with anti-friction materials, e.g. self-lubricating substances or lubricants such as molybdenum disulfide or graphite, or can have low-friction coatings of polytetrafluoroethylene (Teflon).

The free ends of the longer lever arms 12' and 13' are each provided with a jaw 21 or 22 swingably connected to the respective free end by a pivot having a horizontal axis 19 or 20.

The shorter lever arms 12" and 13" of the double-arm levers 12 and 13 extend rearwardly from the flame 16 and protrude therefrom. The lever arm 12" carries a hydraulic cylinder 24 which is swingable about a horizontal axis 23. The piston of this cylinder has a piston rod which is articulated at the horizontal pivot axis 26 to the shorter lever arm 13" of the double-arm lever 13.

Figure 3:
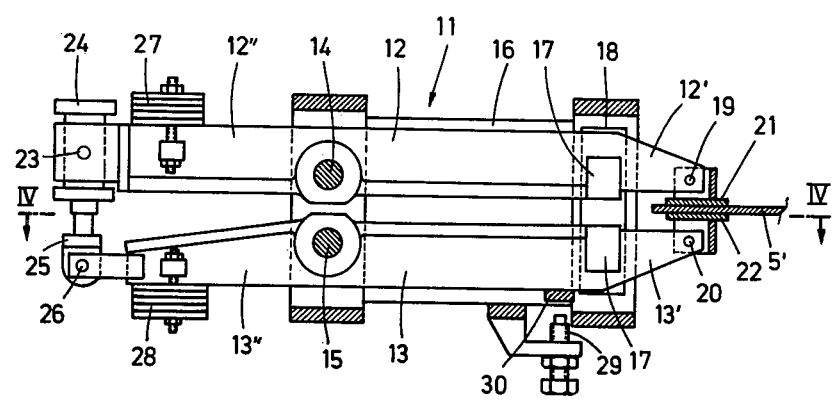
FIG. 3 is an enlarged detail view in section along the line III—III of FIG. 1 of a clamping tongs according to the invention.
Figure 4:
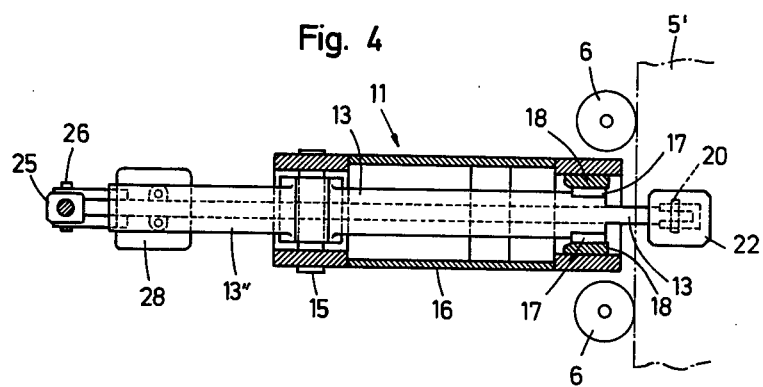
FIG. 4 is a cross-sectional view taken along the line IV—IV of FIG. 3.

Upon retraction of the piston rod 25 into the hydraulic cylinder 24, the jaws 21 and 22 are spread apart while, upon the outward displacement of the piston rod 25 by hydraulic pressurization of the cylinder, the jaws are swung together and fixedly grip the plate 5" between them (see FIG. 3).

To counterbalance the free ends of the lever arms, weights 27 and 28 are affixed to the shorter arms 12" and 13". Naturally, in place of these weights, spring means can be provided to swing the lever 12 in a counter-clockwise sense and the lever 13 in a clockwise sense.

Since the double-arm levers 12 and 13 are freely swingable about their horizontal axes 14 and 15 and the jaws 21 and 22 pivot about the horizontal axes 19 and 20, the longer arms 12' and 13' form the longer sides of a generally parallelegrammatic linkage which follows the vertical movements of the plate 5' so that the latter can move with the usual rocker provided at the downstream side of the shear 1. Nevertheless, this parallelegrammatic-like movement of the tongs 11 insures that the plate section 5' will maintain its precisely positioned orientation with respect to the guide rolls 6. This has been found to ensure a clean cut without the disadvantages previously mentioned.

The common vertical swingability of the tong levers 12 and 13 is advantageously limited in the downward direction by an adjustable abutment 29 which is fixed on the frame 16 while the lower lever 13 carries a plate which can be engaged by the abutment 29. The latter can be threaded into a bracket underhanging the plate 30. This is best seen in FIG. 3.

For the most reliable clamping of the plate 5', it has been found to be advantageous to provide at least two spaced apart pairs of tongs 11 as has been described in connection with FIG. 1.

We claim:

1. A transverse shear for rolled mill products comprising:
   a support provided with a fixed lower blade and a movable upper blade for severing rolled plate between said blades and simultaneously applying a transverse force component to said plate in a direction of progress cutting across the plate;
   a holddown clamp upstream of said blade and substantially adjacent same for retaining said plate against said lower blade;
   lateral-support elements disposed along and engaging the longitudinal edge of said plate at the side thereof toward which the cut progresses; and
   at least one pair of clamping tongs downstream of said blades in the direction of advance of said plate between said blades adapted to grip the plate section downstream of the cut and retaining same in a predetermined orientation relative to said elements, thereby preventing the formation of a wedge-shaped cutting gap converging toward said side as a result of a first component in the plane of said plate section.

2. The transverse shear defined in claim 1 wherein a plurality of spaced apart pairs of such clamping tongs are engageable with said plate section downstream of said blades.

3. The transverse shear defined in claim 2 wherein two such pairs of transverse tongs are provided along said edge of said plate section.

4. The transverse shear defined in claim 1 wherein said pair of clamping tongs comprises a pair of clamp jaws engageable from opposite sides with said plate section along said edge thereof.

5. The transverse shear defined in claim 4 wherein said pair of clamping tongs comprises a pair of double-arm levers each provided with a fulcrum intermediate its ends and having a pivotal axis parallel to said plate section, a housing on which said fulcra axes are fixed, free ends of levers being articulated to the respective jaws about pivotal axes parallel to the respective fulcra axes, and fluid-pressure means between the other ends of said levers for spreading same apart to urge said jaws against said plate section.

6. The transverse shear defined in claim 5, further comprising means on said other ends of said levers for counter-balancing said levers.

7. The transverse shear defined in claim 6 wherein said levers have arms defined between their fulcra and the respective jaws which are guided vertically in said housing but are prevented by said housing from moving horizontally.

8. The transverse shear defined in claim 7 wherein the levers are constructed and arranged for substantially parallelegrammatic movement in a vertical plane, said tongs further comprising abutment means limiting the vertical movement thereof.

9. The transverse shear defined in claim 8 wherein said fluid-pressure means includes a cylinder pivotally connected to one of said levers about a pivot axis parallel to said fulcra axes, and a piston pivotally connected to the other lever about a pivot axis parallel to said fulcra axis.

10. The transverse shear defined in claim 9 wherein said levers have relatively long arms lying within said housing and carrying said jaws and relatively short arms projecting from said housing, and provided with said cylinder and piston, said pair of tongs extending perpendicular to said edge, said latter support elements being constituted as spaced apart rollers having vertical axes, said rollers engaging said edge, said shear further comprising a stop downstream of said pair of tongs and engaging with a leading edge of said plate.

* * * * *